Feb. 4, 1930. G. CAHILL 1,745,978
HEAT INTERCHANGE APPARATUS
Filed Feb. 24, 1927 2 Sheets-Sheet 2
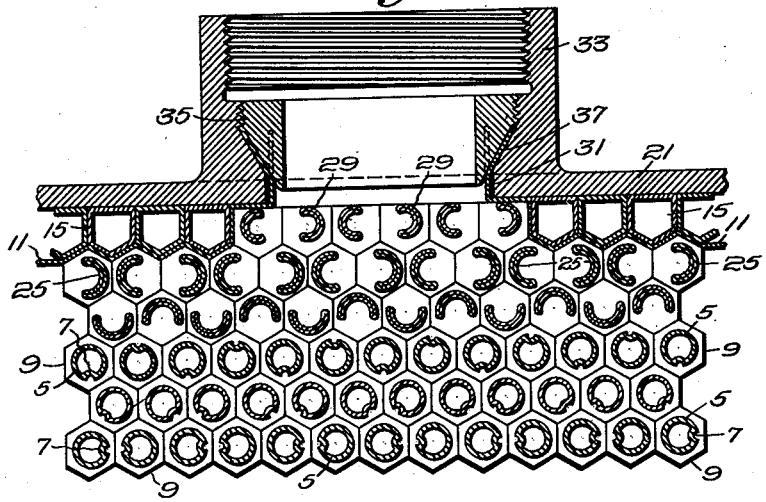
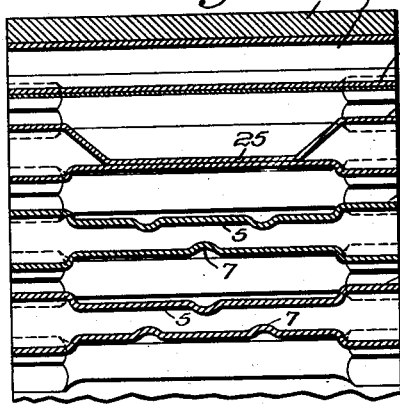
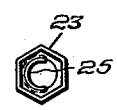
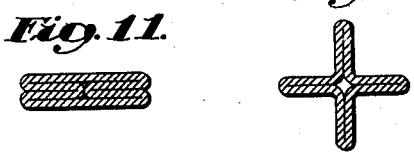
Inventor:
Gerald Cahill Patented Feb. 4, 1930

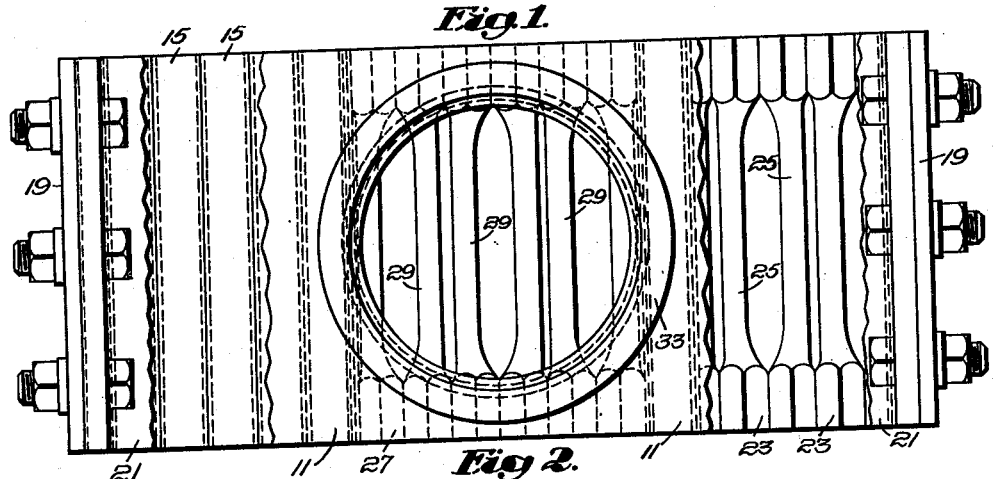
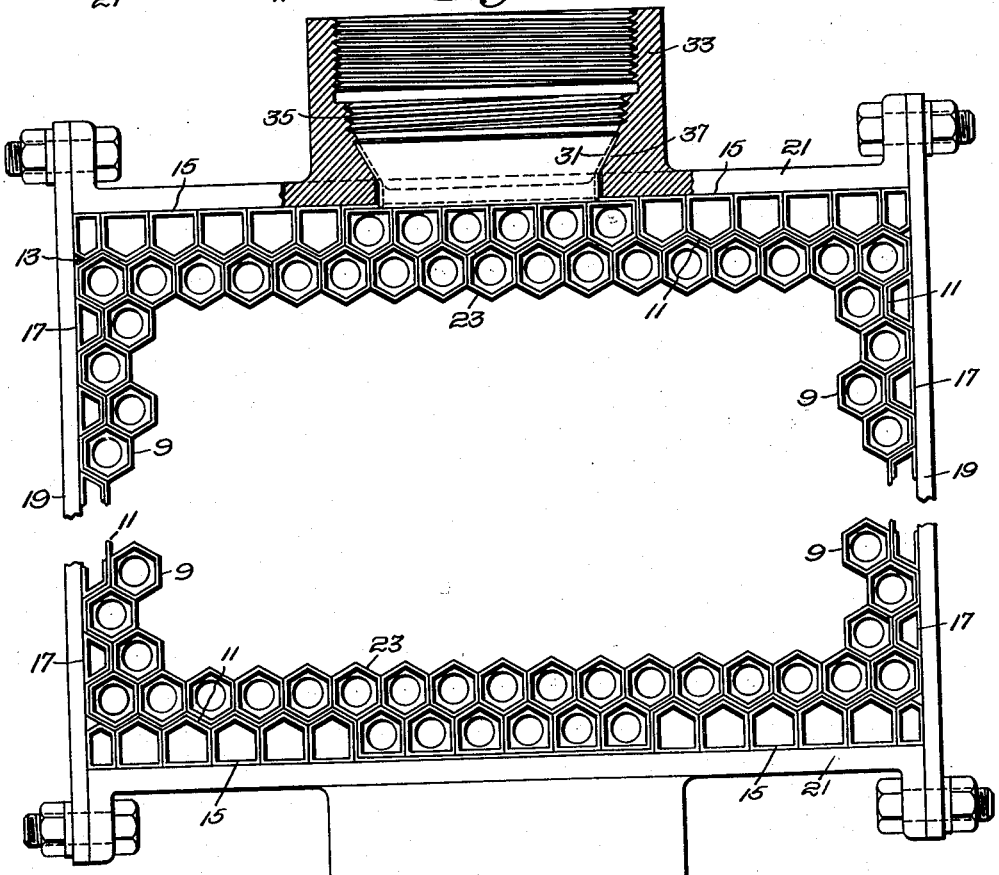

1,745,978

UNITED STATES PATENT OFFICE

GERALD CAHILL, OF LOWELL, MASSACHUSETTS

HEAT-INTERCHANGE APPARATUS

Application filed February 24, 1927. Serial No. 170,506.

This invention relates to heat interchange apparatus and more particularly to apparatus comprising a fluid containing chamber separated from a second fluid containing space by a series of relatively thin contacting walls such, for example, as may be afforded by a cellular or tubular structure through which a fluid, either gaseous or liquid, may be caused to circulate and to effect a heat interchange with a second fluid in contact with the opposite side of the walls thereof.

In constructing such an apparatus it is customary to form a core by the assemblage of thin walled tubular conduits having enlarged ends arranged in closely fitting relation and bonded together to form pressure fluid tight front and rear walls, the sides of such structure being closed in by suitable side walls also bonded to the enlarged tubular ends to form pressure fluid tight joints thereat. It is also customary to provide such structure with inlet and outlet couplings, usually at the top and bottom thereof.

One object of the present invention is to improve and strengthen such structures, particularly in respect to the side and top walls and the cellular structure thereof, and in respect to the coupling attachments thereto.

The invention will be best understood by reference to the following description when taken in connection with the accompanying illustration of one specific embodiment thereof, while its scope will be more particularly pointed out in the appended claims.

In the drawings:

Fig. 1 is a plan view of a heat interchange apparatus embodying one form of the invention, different parts thereof being broken away to illustrate the interior construction;

Fig. 2 is a front elevation, partly broken away, of the apparatus shown in Fig. 1;

Fig. 3 is an enlarged sectional detail taken transverse the tubes and showing the arrangement of the tubes adjacent the inlet couplings;

Fig. 4 is a detail in sectional elevation taken lengthwise the tubes at one side of the inlet coupling;

Figs. 5, 6, 7, 8 and 9 are each a side elevation and end view of one of the various types of tubes employed in forming the cellular structure; and Figs. 10, 11 and 12 illustrate different forms of cross sections which may be imparted to the tubes of the type shown in Figs. 6 and 7.

Referring to the drawings and to the illustrative embodiment of the invention, I have there shown a heat interchange apparatus in the form of a heater comprising a steam chamber traversed by a multiplicity of air circulating tubes, the latter being assembled in such form as to constitute a cellular or tubular heater for heating air passing through the tubes by the utilization of steam or hot water. The main part of the core or body of the heater is prepared by assembling a group of tubes (Fig. 9), the latter being preferably thin walled and formed of copper, brass or other suitable metal. The main body 5 of each tube is, as is customary in such cases, of circular cross section and provided with indentations 7 constituting baffling walls for creating a turbulence of the air, but at each opposite end it is enlarged for a short distance into a head 9, non-circular or polygonal in cross section and herein hexagonal in shape. The heads when grouped or assembled are arranged in close fitting, contacting relation, while the intermediate portions of reduced circular cross section are separated as usual by narrow connecting spaces forming in the aggregate the fluid chamber.

A group of such tubes are assembled in any desired geometrical arrangement, such as the generally rectangular form shown in Fig. 2, the sides and top of the heater being closed in by any suitable means. Herein such closure is effected by a strip or band 11 of copper or other metal and of a width coextensive with the length of the tubes, the strip being formed with corrugations or channels which fit over and against the contour of the hexagonal heads 9 of the tubes, as shown in Fig. 2.

The strip 11, which thus constitutes the side walls of the fluid space, may be formed in one or more pieces joined together in any suitable way, as by means of a soldered lock seam 13 (Fig. 2).

This leaves the sides of the core with an irregular corrugated outline, and in order to provide a smooth exterior for the sides and top and bottom of the core, as, for example, to form the rectangular form illustrated, suitably formed dummy tubes are employed to fill in the depressions in the exterior of the side wall strip 11. In the illustrated form of the invention, a number of five-sided dummy tubes 15 (Fig. 5) are placed at the top and bottom of the core and a number of four-sided dummy tubes 17 (Fig. 8) are utilized at the opposite sides of the core.

The core when thus assembled is held in a temporary frame or form and each opposite face of the core, after having been suitably flux treated is then dipped into a bath of molten solder or bonding metal to cause the bonding material to flow between the contacting sides of the tube and bond or unite them into fluid tight joints, so that the united enlarged ends at the front and rear of the core form respective front and rear fluid tight walls for the container and the strip 11 forms the side and top and bottom walls thereof. After cooling, the form or frame is removed and the core mounted in a holder comprising the side plates 19 and the top and bottom plates 21 bolted thereto.

In devices of this kind it is usually required to provide chambers or spaces at the inlet and outlet ends, the space at the inlet end in the disclosed form of device being utilized for the expansion and distribution of the steam, and the space at the outlet end for condensation. It is important, however, that these expansion and condensation spaces be provided without weakening the walls of the structure or imparting to them any tendency to loosen under vibration or strain. The front and rear walls of the main body of the core are materially stiffened in a structural sense through being united by the tubular portions 5 of the air circulating tubes, which latter act as struts or braces but which, of course, occupy a substantial portion of the heating or pressure fluid space of the heater.

One object of the present invention is to provide a pressure fluid chamber at one or more localized points in the core, as at the inlet and outlet ends thereof, for expansion, condensation, or for other purposes, according to the specific purpose of the apparatus, where there will be available a fluid receiving or distributing space relatively more open than the main body of the core where the tubes 5 occupy such a large portion of the fluid space, while, at the same time, to retain the advantages of mutual reinforcement between the front and rear walls of the core.

As a simple means of securing this result, I have formed the front and rear walls of the core immediately below the inlet and above the outlet of the core out of tubular members (see Fig. 7) having opposite hexagonal heads 23, similar to the hexagonal heads 9, but connected by an interbody portion 25 which is formed to occupy a lesser portion of the heater space than the body portion 5. This result might be had by forming the body portion 25 as a tube of substantially less diameter than the tubular portion 5, but herein I have provided a simple form of connection by deforming the body portion 25 and compressing one wall of the tube against the other to give it a semi-circular cross sectional shape, as will be clear from Fig. 3. Thus, an undented tube, otherwise like that shown in Fig. 9, can be easily shaped to provide the form shown in Fig. 7, thereby providing a structurally stiff and rigid connection between the front and rear walls, occupying but little room and leaving a relatively free open chamber. At the same time the body portion 25 is adapted to act as an effective baffle for distributing the pressure fluid throughout the heater space. Any number of such tubes may be inserted, according to the size of the circulating space which it is desired to provide, and the collapsible body portions 25 may be presented at various angles according to the size of the space and the distribution of the fluid desired. In the illustrated embodiment of the invention, by way of example, I have shown two rows of such tubes at the top, there being also provided a similar arrangement of two rows at the bottom. Instead of deforming the intermediate tubular body portion of the tube into the crescent or semi-circular-like shape illustrated in Fig. 7, it may be deformed into such a cross sectional shape as is shown in Figs. 10, 11 or 12.

In order to preserve the rectangular conformation of the core at the top and bottom, there is provided immediately confronting the inlet and outlet a number of tubes of the form shown in Fig. 6. These comprise five-sided ends 27, similar in shape and size to the tubes 15, but with connecting body portions 29 collapsed into semi-circular form, similar to the body portions 25. The side wall strip 11 is arranged to pass outside of and to follow the contour of the heads 27 of the last named tubes, as will be seen from Figs. 2 and 3.

Centrally at the top of the heater, the enclosing strip 11 is provided with a thin walled raised sleeve or nipple 31 (Fig. 3) of copper or the like, which is designed to form a part of the inlet and lies directly over the body portions 29 of the underlying tubular members. The sleeve or nipple 31, which may be either formed integrally with the side wall strip 11 or may be brazed, soldered or otherwise fastened thereto, is so arranged that the coupling connection to the inlet pipe can be made without bringing any strain on the walls of the core. Heretofore such couplings, which must necessarily be relatively massive as contrasted with the thin walls of the core, have been fastened directly to the core by bonding the same thereto. It has been found difficult in practice by soldering through the dipping method to secure a good bond of the relatively thick walled coupling to the relatively thin walls of the core, and repeated connection and disconnection of the piping to the apparatus have tended to weaken or loosen the coupling as well as the walls of the core themselves. By providing the thin walled nipple or sleeve on the core itself and clamping it as hereinafter described to the coupling, the latter being carried by the reinforcing plate, this difficulty is avoided and a firm and permanent structure provided. It will be understood that while the detailed construction of the inlet end only is shown, a similar construction is used for the outlet end of the core.

Referring to the inlet construction shown in Figs. 2 and 3, the top plate 21 is provided with an internally threaded boss or raised portion 33 adapted to receive the supply pipe coupling (not shown). The boss 33, which may be formed integrally with the plate 21 or firmly fixed thereto, has an opening which fits over the sleeve or nipple 31. When the parts are assembled the nipple extends upwardly into such opening and in the dotted line position shown in Fig. 3. After the tubular members have been assembled and their enlarged ends bonded to each other and to the side strip 11 to form the body of the core, the parts are assembled within the side plates 19 and top and bottom plates 21 with the nipple projecting into the opening in the boss 33. There is then inserted within the boss 33 a compression nut 35 having a tapered lower end adapted to be threaded toward the tapered seat 37 provided within the boss. When the nut 35 is forced down toward the seat 37, it acts to force the upturned end of the nipple also against the tapered seat, where it is clamped firmly between the latter and the tapered walls of the nut. The tapered walls of the nut and those of the seat are preferably finished, and the nut is preferably of steel or relatively hard material, so that the relatively soft copper walls of the strip are forced into firm contact with the seat and provide thereat a pressure tight joint. No strain is brought either upon the joint itself or upon the bonded walls of the core by the act of connecting or disconnecting the pipe coupling.

While I have herein shown and described for the purpose of illustration one specific embodiment of my invention, it is to be understood that extensive deviations may be made therefrom, all without departing from the spirit thereof.

Claims:

1. In a heat interchange apparatus, a core comprising thin-walled air-conducting members with enlarged closely fitting opposite polygonal ends connected by tubular members arranged within the core closely adjacent each other, the enlarged ends being bonded together to form front and rear walls for said core, bonded side walls forming the sides of said core, said side walls having an opening for a pipe connection, and said core also comprising a group of members having similar enlarged opposite polygonal bonded ends but connected by intermediate portions occupying less space than the connecting parts of the air-circulating members, said last named members being localized in a group confronting the opening for said pipe coupling to provide a space within the core relatively open as compared with the space traversed by the air-circulating tubes.

2. In a heat interchange apparatus, a honeycomb core comprising thin-walled air-conducting members with enlarged closely fitting opposite ends bonded together to form front and rear walls for said core and connected by tubular conduits, said core being characterized by a localized group of members having also enlarged opposite ends also bonded together but joined by structural connections occupying less space than the tubular conduits of said air-conducting members, thereby to provide a space within the core relatively open as compared with the space traversed by the air-conducting tubular conduits.

3. In a heat interchange apparatus, a core comprising a multiplicity of thin-walled air-conducting members with enlarged closely fitting opposite ends bonded together to form front and rear walls for said core and connected by tubular conduits, and comprising also a group of members having similar also enlarged interfitting opposite ends also bonded together but connected by intermediate portions comprising tubular members deformed to occupy a lesser amount of space.

4. In a heat interchange apparatus, a honeycomb core comprising a multiplicity of thin-walled air-conducting members with enlarged closely fitting opposite ends bonded together to form front and rear walls for said core and connected by tubular conduits arranged within the core closely adjacent to each other, and comprising also a group of members having similar enlarged interfitting opposite ends also bonded together but connected by intermediate portions occupying less space than the connecting parts of the air-conducting members.

5. In a heat interchange apparatus, a honeycomb core comprising a multiplicity of tubular members with interfitting enlarged ends bonded together, said core having bonded side walls, one of which presents an outwardly extending sleeve, a reinforcing plate having an opening adapted to receive the sleeve, a tapered seat presented by the reinforcing plate, and a tapered nut adapted to clamp the walls of said sleeve to said tapered seat.

6. A heat interchange apparatus comprising a honeycomb core of thin-walled tubular members having closely fitting enlarged ends bonded together to form the front and rear walls of the core, bonded side walls to form the side walls thereof, an outwardly directed sleeve presented by one of said side walls, a reinforcing plate secured exteriorly to said core, and means for clamping the walls of said sleeve to said reinforcing plate.

7. A heat interchange apparatus comprising a honeycomb core of thin walled tubular members having closely fitting enlarged ends bonded together to form the front and rear walls of the core, bonded side walls to form the sides thereof, an outwardly-directed, thin-walled sleeve presented by one of the side walls, a reinforcing member secured exteriorly to said apparatus, a pipe coupling carried by said reinforcing member and adapted to receive the sleeve within the same, and means for clamping the sleeve within said pipe coupling to provide a pressure tight connection therewith.

8. A heat interchange apparatus comprising a honeycomb core of thin walled tubular members having closely fitting enlarged ends bonded together to form the front and rear walls of the core, bonded side walls to form the sides thereof, an outwardly-directed, thin-walled sleeve presented by one of the side walls, a reinforcing member secured exteriorly to said apparatus, a pipe coupling carried by said reinforcing member, and means for attaching the pipe coupling to said sleeve to cause the inherent strains arising from the connection and disconnection of said pipe coupling to the pipe line to be taken by said reinforcing member.

9. A heat interchange apparatus comprising a honeycomb core of thin walled tubular members having closely fitting enlarged ends bonded together to form front and rear walls of the core, bonded side walls to form the sides thereof, an outwardly-directed sleeve presented by one of said side walls, a pipe coupling, and means for clamping said sleeve to said coupling to make a pressure tight connection.

In testimony whereof, I have signed my name to this specification.

GERALD CAHILL.